US010339235B1

(12) United States Patent
Ciarlini et al.

(10) Patent No.: US 10,339,235 B1
(45) Date of Patent: Jul. 2, 2019

(54) MASSIVELY PARALLEL PROCESSING (MPP) LARGE-SCALE COMBINATION OF TIME SERIES DATA

(71) Applicant: EMC Corporation, Hopkinton, MA (US)

(72) Inventors: Angelo E. M. Ciarlini, Rio de Janeiro (BR); Jonas F. Dias, Rio de Janeiro (BR); André de Almeida Maximo, Rio de Janeiro (BR); Vinícius Michel Gottin, Rio de Janeiro (BR); Monica Barros, Rio de Janeiro (BR)

(73) Assignee: EMC Corporation, Hopkinton, MA (US)

( * ) Notice: Subject to any disclaimer, the term of this patent is extended or adjusted under 35 U.S.C. 154(b) by 515 days.

(21) Appl. No.: 15/078,224

(22) Filed: Mar. 23, 2016

(51) Int. Cl.
  *G06F 17/50* (2006.01)
  *G06F 17/18* (2006.01)

(52) U.S. Cl.
  CPC ......... *G06F 17/5009* (2013.01); *G06F 17/18* (2013.01); *G06F 2217/16* (2013.01)

(58) Field of Classification Search
  CPC ... G06F 17/5009; G06F 17/18; G06F 2217/16
  USPC .......................................................... 703/2
  See application file for complete search history.

(56) References Cited

U.S. PATENT DOCUMENTS

| | | | | |
|---|---|---|---|---|
| 9,060,714 B2 * | 6/2015 | Bajcsy | .................... | A61B 5/11 |
| 9,691,395 B1 * | 6/2017 | Sieracki | .................. | G10L 17/26 |
| 9,755,714 B2 * | 9/2017 | Bose | .................... | H04B 7/0452 |
| 2011/0182352 A1 * | 7/2011 | Pace | ...................... | G06T 9/001 |
| | | | | 375/240.1 |

(Continued)

OTHER PUBLICATIONS

Dutta, Sanghamitra, and Arijit De. "LAMP: A Locally Adapting Matching Pursuit Framework for Group Sparse Signatures in Ultra-Wide Band Radar Imaging." arXiv preprint arXiv:1411.4020 (2014). pp. 1-14.*

(Continued)

*Primary Examiner* — Kamini S Shah
*Assistant Examiner* — John E Johansen
(74) *Attorney, Agent, or Firm* — Ryan, Mason & Lewis, LLP (57) ABSTRACT

Methods and apparatus are provided for performing massively parallel processing (MPP) large-scale combinations of time series data. A given working compute node in a distributed computing environment obtains a given group of time series data of a plurality of groups of time series data; generates a measurement matrix for the given group based on a plurality of selected time series and a plurality of time lags of the selected time series; processes the measurement matrix to generate a first linear model with a predefined number of first independent selected variables; assigns a score to each first independent selected variable; and provides the first independent selected variables and assigned scores to a master compute node that ranks the first independent selected variables for all groups from all working computing nodes according to assigned scores; selects a predefined number of second independent selected variables based on a final rank to create a final group of time series; and processes the final group of time series to generate a final linear model.

20 Claims, 5 Drawing Sheets

(56) References Cited

U.S. PATENT DOCUMENTS

| | | | | |
|---|---|---|---|---|
| 2014/0167754 | A1* | 6/2014 | Jerecic | G01R 33/561 324/309 |
| 2017/0104503 | A1* | 4/2017 | Pratt | H04B 1/0475 |
| 2017/0222753 | A1* | 8/2017 | Angelopoulos | H04L 1/0043 |

OTHER PUBLICATIONS

Sundman, Dennis, Saikat Chatterjee, and Mikael Skoglund. "Distributed greedy pursuit algorithms." signal Processing 105 (2014). pp. 298-315.*

Wang, Rui, et al. "A reducing iteration orthogonal matching pursuit algorithm for compressive sensing." Tsinghua Science and Technology 21.1 (2016). pp. 71-79.*

Yang, Bin, and Shutao Li. "Pixel-level image fusion with simultaneous orthogonal matching pursuit." Information fusion 13.1 (2012). pp. 10-19.*

Dutta, Sanghamitra, and Arijit De. "LAMP: A Locally Adapting Matching Pursuit Framework for Group Sparse Signatures in Ultra-Wide Band Radar Imaging." arXiv preprint arXiv:1411.4020 (2014). pp. 1-14. (Year: 2014).*

Sundman, Dennis, Saikat Chatterjee, and Mikael Skoglund. "Distributed greedy pursuit algorithms." signal Processing 105 (2014). pp. 298-315. (Year: 2014).*

Wang, Rui, et al. "A reducing iteration orthogonal matching pursuit algorithm for compressive sensing." Tsinghua Science and Technology 21.1 (2016). pp. 71-79. (Year: 2016).*

Yang, Bin, and Shutao Li. "Pixel-level image fusion with simultaneous orthogonal matching pursuit." Information fusion 13.1 (2012). pp. 10-19. (Year: 2012).*

Weinstein, A. J., & Wakin, M. B. (Aug. 2012). Online search orthogonal matching pursuit. In Statistical Signal Processing Workshop (SSP), 2012 IEEE. pp. 584-587. (Year: 2012).*

Raksuntorn, N., Du, Q., Younan, N., & Li, W. (Jul. 2014). Orthogonal matching pursuit for nonlinear unmixing of hyperspectral imagery. In Signal and Information Processing (ChinaSIP), 2014 IEEE China Summit & International Conference on. pp. 157-161. (Year: 2014).*

Amirhossein Jofreh, "Parallel Implementation of Orthogonal Matching Pursuit OpenCL", Eastern Mediterranean University, Aug. 2013 http://i-rep.emu.edu.tr:8080/jspui/bitstream/11129/1384/1/JofrehAmirhossein.pdf.

Pati, Y. C., Rezaiifar, R., & Krishnaprasad, P. S. (1993). Orthogonal matching pursuit: recursive function approximation with applications to wavelet decomposition. In Proceedings of 27th Asilomar Conference on Signals, Systems and Computers (pp. 40-44). Pacific Grove, CA: IEEE Comput. Soc. Press. doi:10.1109/ACSSC.1993.342465.

* cited by examiner

ORTHOGONAL MATCHING PURSUIT ALGORITHM

Input: X, Y, k

Output: $b$, $\beta$, $\theta$ $X_0 = X$, $e_0 = Y$, $j = 0$

While $j \leq k$ do

$j = j + 1$

$\beta_j = \text{argmax}_{(t=1,\ldots,N)} |\langle e_{j-1}, s_i \rangle|$     $X_j = [X_{j-1} s_{\beta_j}]$     $b_j = \text{argmin}_b \| X_j b - Y \|_2$     $\theta_j = X_j b_j$     $e_j = Y - \theta_j$ End while

MASSIVELY PARALLEL PROCESSING (MPP) LARGE-SCALE COMBINATION OF TIME SERIES DATA

FIELD

The field relates generally to techniques for generating multivariate statistical models from time series that explain a target time series in specific situations.

BACKGROUND

The Internet-of-Things (IoT) is a network of physical objects, such as devices and sensors, that enables the physical objects to collect and exchange data. The Internet-of-Things has contributed to the growth of the number of sensors and the corresponding amount of data generated by the sensors in residential and industrial environments. By collecting data generated from the sensors, a large number of time series data tends to be available for processing.

An objective of a time series analysis is to explain the behavior of a series using past values of the time series. Many common behavior models are univariate, that is, a series is modelled using only its own previous values as explanatory variables. In a multivariate setting, a time series is explained by its own past values, as well as the past and present values of other series of interest. For example, industrial plants often have thousands of sensors designed to monitor the status of a given plant and feed automated control systems. It is important to estimate the relationship between a given performance indicator and a set of variables (sensor streams). This may reveal the underlying structure of the physical model and allows the current and optimal operational conditions of the plant to be assessed. When the outcome of an industrial process is influenced by many different inputs, predictive models can help to identify the best actions to optimize the outcome in different situations. In addition, models to explain a target time series in specific situations can be used to monitor an industrial process so that detachment between predicted and observed values indicate potential problems to be solved.

In order to derive intelligence from the collected data, a need exists for the ability to process a large number of large-scale time series and compute reasonable multivariate models in real-time.

SUMMARY

Illustrative embodiments of the present invention provide methods and apparatus for performing massively parallel processing (MPP) large-scale combinations of time series data. In one exemplary embodiment, a method for generating one or more multivariate statistical models from time series data for a given target time series, comprises obtaining a given group of time series data on a given working compute node, wherein the given group comprises one of a plurality of groups of time series data selected from a larger set of time series data; generating a measurement matrix, using the given working compute node, for the given group of time series data based on a plurality of time series selected for the given group and a plurality of time lags of the selected time series; processing, using the given working compute node, the measurement matrix for the given group to generate a first linear model for the given group using an Orthogonal Matching Pursuit algorithm with a predefined number of first independent selected variables, each first independent selected variable corresponding to a specific time series and lag; assigning a score, using the given working compute node, to each of the first independent selected variables based on an order of an absolute value of a coefficient of the first independent selected variable within the linear model of the plurality of time series selected for the given group and the corresponding plurality of time lags; and providing the first independent selected variables and the corresponding assigned scores to a master compute node, wherein the master compute node obtains first independent selected variables and corresponding assigned scores for each of the plurality of groups from a plurality of the working compute nodes; ranks the the first independent selected variables according to the corresponding assigned scores for all of the plurality of groups; selects a predefined number of second independent selected variables based on a final rank to create a final group of time series; and processes the final group of time series to generate a final linear model using the Orthogonal Matching Pursuit algorithm. The final linear model characterizes a target time series represented as a linear combination of a plurality of other time series and time lags.

In one or more embodiments, the plurality of groups of time series data selected from the larger set of time series data are selected using an arbitrary function F. The arbitrary function F one or more of creates each of the plurality of groups based on one or more of random and deterministic choices; assigns at least a portion of the plurality of time series to a plurality of the groups and assigns the plurality of time series to a balanced number of the groups.

In at least one embodiment, a plurality of the working compute nodes process, substantially in parallel, the plurality of groups in a distributed computing environment and each of the working compute nodes performs the steps of obtaining the given group of time series data, generating the measurement matrix, processing the measurement matrix, assigning the score to each of the first independent selected variables and providing the first independent selected variables and the corresponding assigned scores to the master compute node.

In one or more embodiments, a plurality of hierarchical learning levels generate the final linear model and wherein in each intermediate level of the hierarchy, intermediate compute nodes execute the roles of the master compute node for compute nodes of the lower hierarchical level and working compute nodes for the compute nodes of the upper hierarchical level, receive the first independent selected variables and corresponding assigned scores from lower-level compute nodes, rank the first independent selected variables, select a predefined number of the first independent selected variables based on the corresponding assigned scores to be considered as input for the generation of an intermediate linear model using the Orthogonal Matching Pursuit algorithm, assign a score to each first independent selected variable of the intermediate model and provide the first independent selected variables and the corresponding assigned scores to an upper level in the hierarchy.

Advantageously, illustrative embodiments of the invention provide improved techniques for massively parallel processing (MPP) large-scale combinations of time series data. These and other features and advantages of the present invention will become more readily apparent from the accompanying drawings and the following detailed description.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for performing massively parallel processing (MPP) large-scale combinations of time series data. While aspects of the present invention are illustrated in the context of the oil-and-gas industry, the present invention applies in any environment having multiple time series data, potentially with time lags, where one or more of these time series are selected to explain, by a linear model, one particular time series of interest, referred to as a target time series. Each time series is considered to be a variable in a multivariate linear problem, where the desired model contains one coefficient multiplying each selected variable, and the summation of all selected variables approximates the target variable. Other environments where such a model is useful include, without limitation, finance, economics, security, energy, marketing, and the social sciences, as would be apparent to a person of ordinary skill in the art.

According to one aspect of the invention, a massively parallel processing (MPP) approach is provided to compute multivariate linear models. The application of the method is described using an exemplary Orthogonal Matching Pursuit (OMP) algorithm. See, for example, Y. Pati et al., "Orthogonal Matching Pursuit: Recursive Function Approximation With Applications to Wavelet Decomposition," Proc. of 27th Asilomar Conf. on Signals, Systems and Computers, 40-44 (1993), incorporated by reference herein in its entirety. One feature of the OMP algorithm is that it provides a better explanation for the target time series by selecting variables that are as orthogonal as possible.

In one or more embodiments, the use of massive parallelization in the search for a predictive/exploratory model allows for an efficient investigation of the best model that can be obtained from the combination of a large number of time series from various sensors and corresponding time lags of the time series data. The massive parallelization allows, for example, many thousands of time series (and time lags) to be processed that are candidates to be used in the model that explains or predicts a target time series. As discussed further below, massive parallelization, in one alternative implementation of a first learning stage, deals with random small subsets of series (and their time lags). As the number of time series in each first stage group is significantly smaller than the number in the original time series, computation is much faster in each distributed node. Another alternative implementation is to group the series by a given domain context, for instance, making time series from sensors of the same physical area in an oil-and-gas off-shore platform pertain to the same group. A second learning stage is applied to the paired series-lags that have been ranked based on the partial models obtained from the first stage. In this manner, the total time to obtain a final model is substantially equivalent to the execution of the learning stage with a small number of time series. It can be shown that, in at least one embodiment, the total time is at least two orders of magnitude shorter than selecting a best model from a single set with all possible time series and time lags.

The disclosed approach can produce linear models from large input data in near real-time. One exemplary implementation is able to generate models, for example, hundreds of times more quickly than conventional approaches. The accuracy of the generated models for the OMP algorithm is substantially equivalent to the accuracy of the models obtained by means of the original OMP algorithm.

Figure 1:
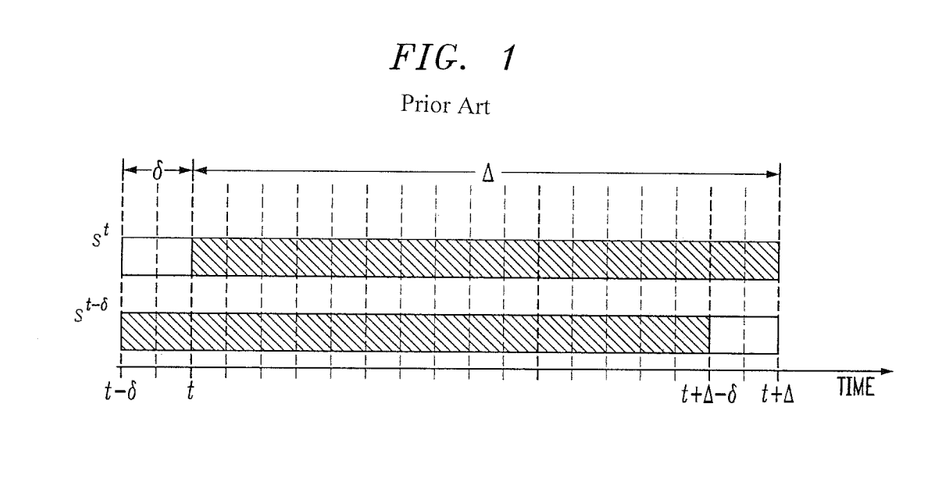
FIG. 1 illustrates a time series and a corresponding lagged time series that may be processed by one or more embodiments of the invention.

FIG. 1 illustrates a time series $s^t$ and a lagged time series $s^{t-\delta}$ that lags the original time series $s^t$ by $\delta$ time intervals. In one or more exemplary embodiments, a target time series is represented as a linear combination of k other series. Consider a set $\{s_1^t, s_2^t, \ldots, s_n^t\}$ of n measured sensor streams, each captured as a time series $s^t$ observed from time t until time (t+$\Delta$).

Now suppose that the time series $s^t$ is shifted by $\delta$ time intervals to generate the lagged time series $s^{t-\delta}$. As shown in FIG. 1, one can build a new series, $s^{t-\delta}$, that starts at time t−$\delta$ and ends at (t+A−$\delta$). The lagged time series $s^{t-\delta}$ is referred to as the $\delta^{th}$ lag of the time series $s^t$. Note that both $s^t$ and $s^{t-\delta}$ have the same number ($\Delta$) of observations.

It is noted that what is currently measured in a sensor may affect the same and/or other sensors in a future instant of time. However, these causality relationships are often hard to know a priori. Therefore, in order to capture the time dynamics in the model, different lags of the time series need to be considered. If m is the number of lags for each series and n is the number of measured streams, then the total number of series is N=n×m. If n and m are large enough, a regular multivariate statistical model might take weeks to be calculated, even on robust computer machines with abundant physical memory. However, in order to take actions, decision makers might require the results of such models at near real-time. They might also need to compute different models repeatedly and update them frequently. The problem to be solved is the computation of such models very quickly using an MPP approach.

Consider a measurement matrix X where each column is a measured sensor stream or a lag of the measured sensor stream:

$$X=[s_1^t, s_1^{t-\delta}, \ldots, s_1^{t-m\delta}, s_2^t, s_2^{t-\delta}, \ldots, s_2^{t-m\delta}, \ldots, s_n^t, s_n^{t-\delta}, s_n^{t-m\delta}].$$

In order to obtain a model for a target series Y, solve the following system of equations:

$$Y=Xb+e,$$

where b is the vector of the coefficients of the model, and e corresponds to the residuals. In order to solve this system of linear equations to build the model, minimize the squared sum of residuals corresponding to each time, with the constraint that the maximum number of coefficients in b that are different from zero should be k. In addition, the variables (pairs series-lag) assigned to these coefficients should be as independent as possible. In this way, the resulting model can capture most of the relevant influences on the target time series.

In one or more embodiments, the Orthogonal Matching Pursuit algorithm (OMP) is employed. One or more aspects of the invention provide techniques for running OMP more efficiently. An MPP approach is used that solves the regression problem on smaller matrices composed of subsets of the input variables. On a second step, partial results are collected for each submatrix, a ranking for pairs series-lag are created and a final execution of the OMP algorithm is run with only top-ranked pairs. One may also note that the disclosed solution applies to a general regression problem, not only using OMP in a time series context.

MPP Approach for Multivariate Regression

From the input set of time series $X=\{s_1^t, s_2^t, \ldots, s_n^t\}$, G subsets are selected with each having g series. In one or more embodiments, the series are selected by an arbitrary function F. Each subset is referred to as a group of series. A measurement matrix is built for each group considering the series selected for that group and m of their lags. Since $g \ll n$, the regression problem with the g×m series of each group can be computed very quickly. The models are computed, and the top-k variables (pairs series-lag) are selected as ranked by their coefficient. The variable with the highest coefficient (in absolute value) is ranked with value k. The second variable with the highest coefficient is ranked with value k−1, the third, k−2, and so on. After the ranking, the G models are assembled and the ranks of selected variables that appeared more than once are summed. The intuition behind this "two-level ranking" is to privilege series that were consistently selected on different groups. Again, a predefined number top-p variables are selected based on the final rank to create a final group. This final group of series is used as input to OMP in order to compute a final model with coefficients for the top-k variables.

Figure 2:
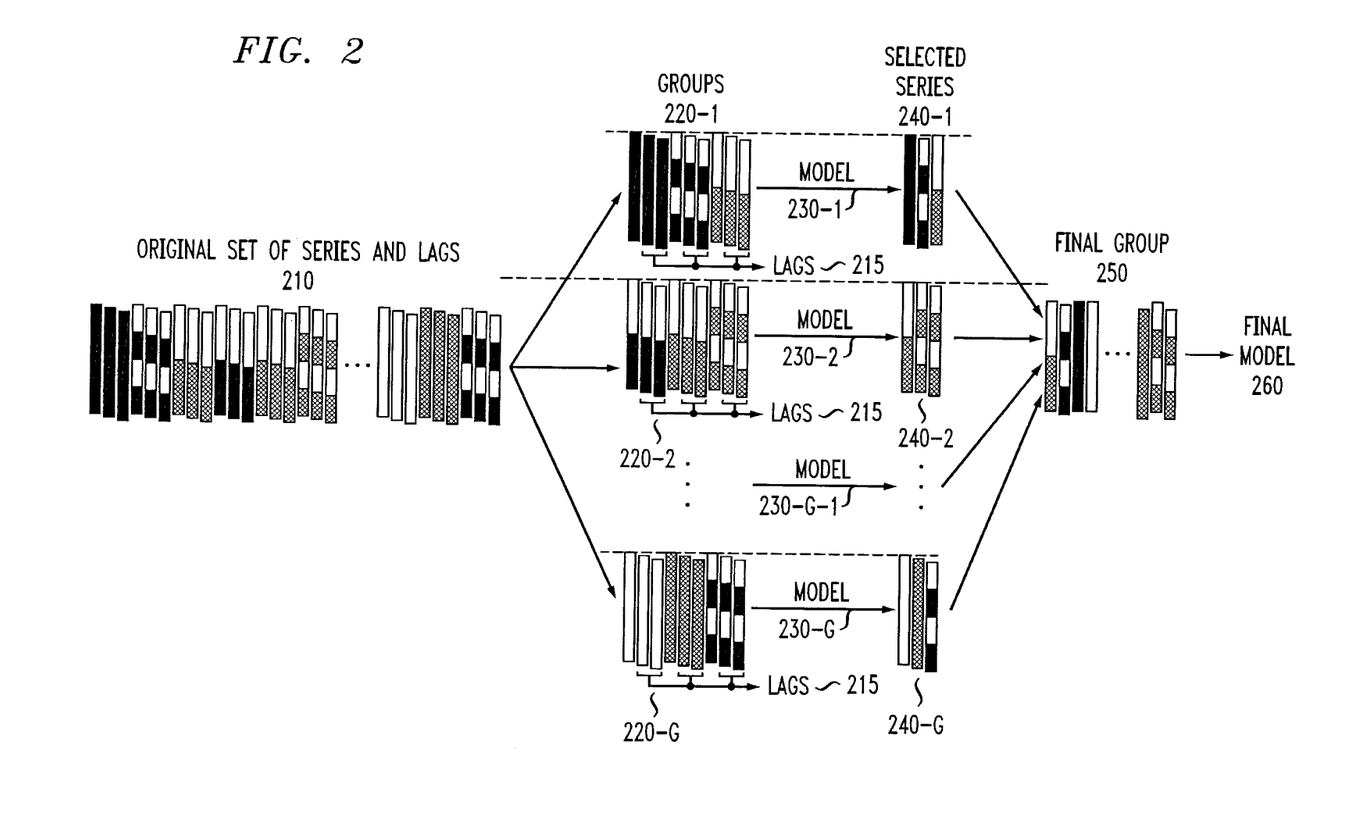
FIG. 2 illustrates an exemplary massively parallel processing (MPP) approach for multivariate regression.

FIG. 2 illustrates an exemplary MPP approach for multivariate regression. In the example of FIG. 2, groups 220-1 through 220-G (3 groups are shown in FIG. 2 for ease of illustration) are specified by a master compute node, discussed further below in conjunction with FIG. 4, based on an original set of m series (and their lags) 210 (9 series are shown in FIG. 2 for ease of illustration, with each distinct series having a different hash pattern). Each exemplary series 210 comprises the data from one sensor and its lags. Each group 220 picks, for example, three series 210 from the original set and considers two lags 215 for each original series. A given series (and its lags) 210 are kept in the same random group 220. The models 230 for the groups 220 are computed substantially in parallel. In the end, the selected series 240 are ranked and selected for the final group 250 (of selected series from all groups 220), which is used to build the final model 260. Each selected series 240 comprises, for example, one original value or a lag for each series in the given group, or one series can be excluded and duplicate values from another series can be included (as in the second selected series 240-2). The parallel execution of the smaller models 230 runs more quickly than a serial implementation and works as a filter to build a final model 260 with the most relevant series 210 without the price of considering too many data as input.

A working compute node in a distributed compute environment processes a corresponding group 220 and performs the selection of the corresponding selected series 240, using the appropriate model 230 (which has been generated by the respective distributed compute node), as discussed further below in conjunction with FIG. 4. The final group 250 and the final model 260 are created by the master compute node. Thus, in at least one embodiment, the master compute node orchestrates the series that go into each group 220, and computes the final model 260 from the selected series 240 of each group 220.

Consider n=10,000 series 210 with v=43,200 observations and m=100 lags per series 210. The input matrix of the regression problem is v×(n·m)=43,200×1,000,000, which may be prohibitive on a single machine. However, if G is equal to 400 groups 220 that are considered with g equal to 50 series 210 per group 220, there are G input matrices of size v×(g×m)=43,200×5,000. The model 230 in each group 220 can be computed substantially in parallel on distributed compute nodes and, since the input matrix is small, the processing time is relatively short.

In the first stage, each distributed working compute node works with a small subset of time series 210 in the respective group 220. This could potentially reduce the accuracy of the final model 260, since some groups 220 could contain many "good" time series 210 to be part of the model, and some groups 220 could contain "bad" time series 210 to be part of the model. In this case, the ranking mechanism might not select the best time series to explain or predict the target. In one or more embodiments, this potential problem is dealt with by creating the groups randomly, making sure that a specific time series appears in various groups 220. In this way, to have a good ranking and be selected for the second phase 240, the selected time series has to be good enough to beat many time series in different groups 220.

It can be shown that by creating a minimal amount of random groups 220, the OMP algorithm models 260 generated with the disclosed method are as good as those generated with a single instance of the OMP algorithm (which would take much longer to be computed).

In the generated models, the same time series 210 can have multiple coefficients, one for each different time lag 215 (thereby increasing the amount of data to be processed). This is important, in particular, due to the fact that many Physical and Chemical phenomena, for example, depend on derivatives of values measured by sensors (the lags are correlated with derivatives).

The disclosed parallelization of the creation of the models 230 takes care of concentrating all lags 215 of each time series 210 in the same groups. It is important to select just the lags 215 that are most relevant. If the choice of paired series 210 and lags 215 is randomized, highly correlated time series 210 could artificially have more lags 215 selected for the second stage 240. Furthermore, in other groups 220, lags 215 that would be discarded are considered for the second stage 240 because they are not compared to better series 210 since they are not in the same group 220. With a large concentration of lags 215 for the same time series 210 in the second stage 240, the final model 260 could be worse.

When better performance is desired, more working compute nodes can be used to execute the first learning stage 220. In this way, groups 220 can be smaller but redundancy of the inclusion of time series 210 in different groups 220 can improve the accuracy. If it is necessary to improve performance even further, due to the number of time series 210, the procedure can be generalized by creating multiple hierarchical learning stages, as would be apparent to a person of ordinary skill in the art. In this case, there is a plurality of hierarchical learning levels to generate the final model and in each intermediate level of the hierarchy, intermediate compute nodes execute both the roles of master compute node for compute nodes of the lower hierarchical level and working compute nodes for the compute nodes of the upper hierarchical level. Intermediate compute nodes receive selected variables and scores from lower-level compute nodes and perform the following steps: rank the variables; select a pre-defined number of variables based on their scores to be considered as input for the generation of an intermediate linear model using an Orthogonal Matching Pursuit algorithm; assign a score to each variable of the intermediate model; and provide such variables and their corresponding scores to the upper level in the hierarchy.

In one or more representative embodiments, the OMP algorithm is used to compute the models 230 for each group 220 and the final model 260. The OMP algorithm is executed on each distributed compute node that computes the models 230 for each group 220 and the final model 260.

Figure 3:
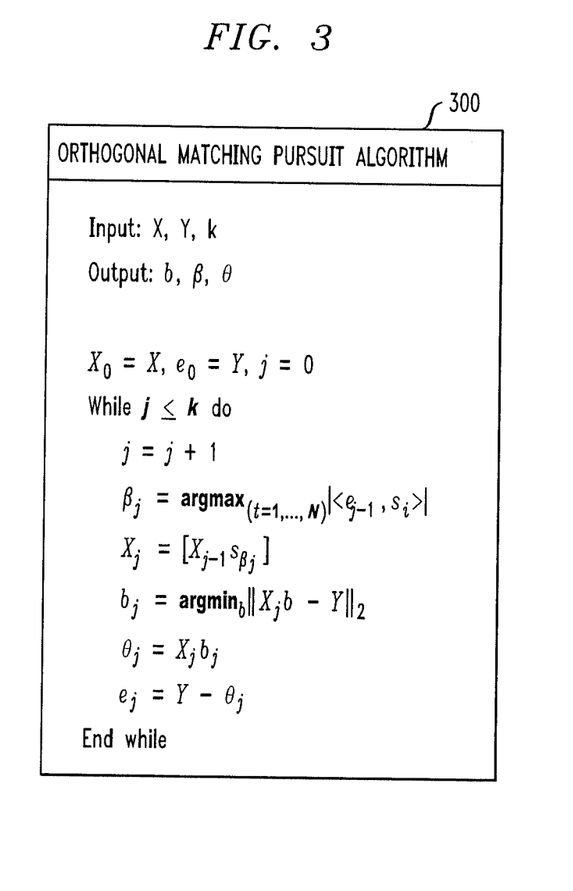
FIG. 3 illustrates pseudo code for an exemplary implementation of an Orthogonal Matching Pursuit (OMP) algorithm that is employed by one or more embodiments of the invention.

FIG. 3 illustrates exemplary pseudo code for the OMP algorithm 300. The OMP algorithm 300 is a greedy algorithm that, on every iteration, j, searches for the series $s_{\beta_j}$ that better explains the residual $e_{j-1}$ between the target Y series and the current explanation $\theta_{j-1}$. The vector $b_j$ of coefficients is updated on each iteration by means of a minimization, in a known manner.

One advantage of the OMP algorithm 300 is that it progressively selects new series 210 that are orthogonal, i.e., linearly independent, from a current explanation. This is useful because many of the input series 210 are linearly dependent on each other. By running the OMP algorithm 300, a set of k almost linearly independent series 210 are obtained which explain the target variable. Nevertheless, the computation of the OMP algorithm 300 for large matrices might take weeks and require huge amounts of physical memory. These restrictions remain if the OMP algorithm 300 is replaced by other regression algorithms, such as Least Angle Regression (LAR) or Least Absolute Shrinkage and Selection Operator (LASSO).

To create the groups 220, a function F is used that randomly selects series 210. In the exemplary case with 10,000 series 210, 400 groups 220 and 50 series per group, by picking series 210 randomly, the chances are that they will be part of two or more groups 220. The likelihood increases as the number of groups 220 and series per group are increased. It is noted that increasing the number of groups 220 also increases the degree of parallelism, while increasing the number of series per group makes the computation more complex.

Figure 4:
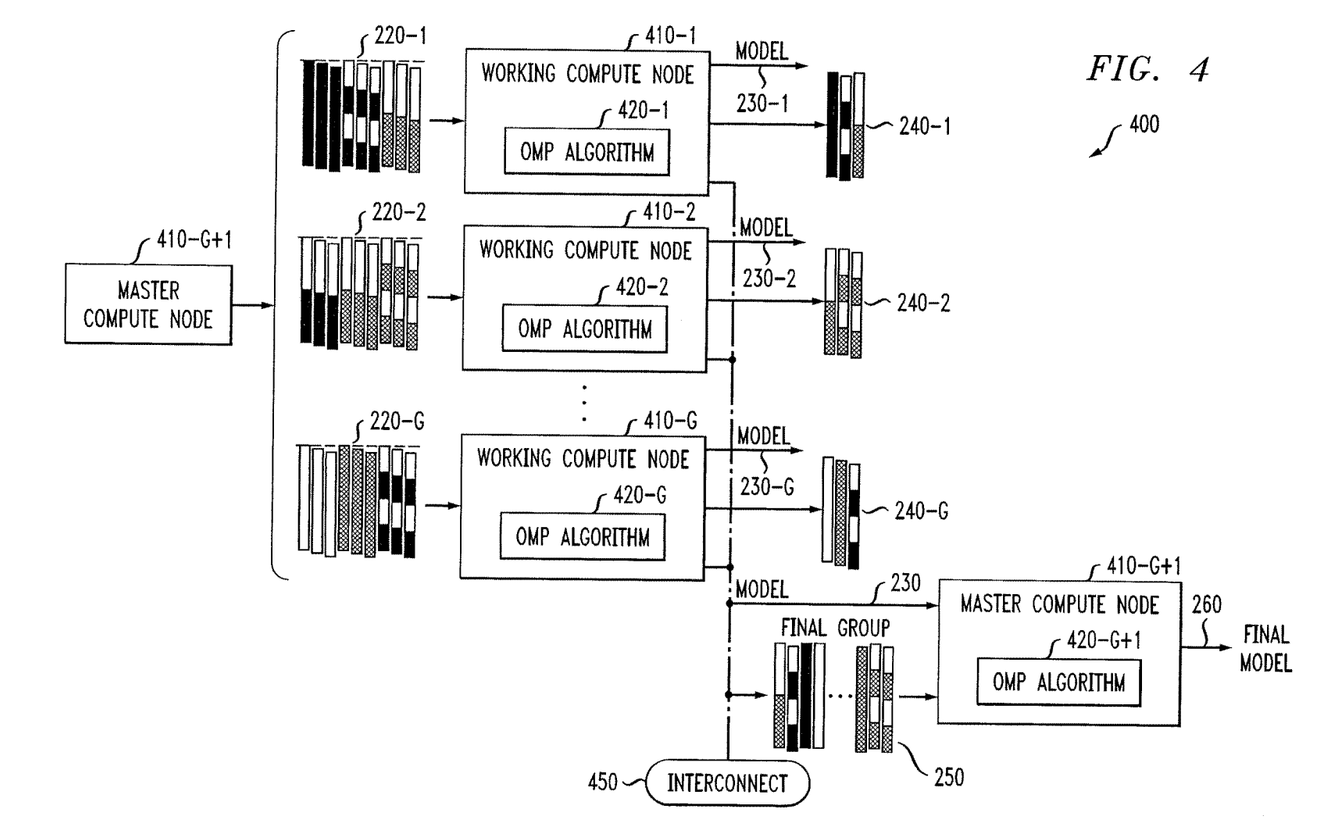
FIG. 4 illustrates an exemplary distributed computing environment incorporating aspects of the present invention.

FIG. 4 illustrates an exemplary distributed computing environment 400 incorporating aspects of the present invention. As shown in FIG. 4, the exemplary OMP algorithm 420-1 through 420-G+1, as discussed above in conjunction with FIG. 3, executes on each distributed compute node 410-1 through 410-G+1, connected by an interconnect 450. Distributed working compute nodes 410-1 through 410-G each process a corresponding group 220, and master compute node 410-G+1 serves as the single master compute node. It is noted that one of the distributed working compute nodes 410-1 through 410-G may also serve as the master compute node 410-G+1. As noted above, in at least one embodiment, the master compute node 410-G+1 selects the time series 210 that go into each group 220, and computes the final model 260 from the selected series 240 of each group 220. Each distributed compute node 410-1 through 410-G+1 may be implemented, for example, in accordance with the exemplary computing system 500 of FIG. 5, as discussed further below in conjunction with FIG. 5.

As shown in FIG. 4, each working compute node 410-1 through 410-G processes a corresponding group 220-1 through 220-G of time series subsets, and generates a corresponding selected series 240-1 through 240-G. In addition, master compute node 410-G+1 receives the final group 250 of selected time series data from the various compute nodes 410-1 through 410-G, and generates the final model 260.

Typically, each compute node 410 comprises a processor coupled to a memory (not shown in FIG. 4). The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein may be viewed as examples of what are more generally referred to as "computer program products" storing executable computer program code.

The processing circuitry of each compute node 410 implements the OMP pseudo code 300, discussed above in conjunction with FIG. 3. Each exemplary OMP algorithm 420 may be implemented at least in part in the form of software that is stored in the memory and executed by the processor. Each compute node 410 comprising a processor, a memory and network interface components as described above is an example of what is more generally referred to herein as a "processing device." Each of the devices described herein may similarly be implemented as a processing device comprising a processor, a memory and network interface components.

Examples

Offline Use for Sensibility Analysis

A target series can be selected and complex models for that series can be generated quickly under varied circumstances. One might be interested in creating models 230 that are based only on sensors from a specific part of an industrial plant. One might also want to consider only specific types of sensors. The target time series 210 of interest might vary. The values of the time series 210 are normalized before the training phase, thus coefficients represent how important each time series 210 (and corresponding lag 215) is in the final outcome 260.

In addition, one might want to establish constraints on minimal and maximal lags 215 and the size of the lags 215. For example, when there is an interest in studying the outcome based on the variation of controlled variables, one might want to establish a minimal lag 215.

The performance provided by the disclosed approach is important to obtain the responsiveness demanded by the sensibility analysis of complex systems.

Online Use for Anomaly Detection

The ability to create multiple models very quickly can be used to obtain models that represent transitory states of an industrial plant. When drastic detachments occur, i.e. predicted values are very different from observed values; this might indicate a situation that deserves special attention. On the other hand, models might need to be updated in the long run so that they can capture the current state of the plant. This is true in particular when models are linear but the overall phenomena being monitored is not. In this way, it is crucial to create and update models efficiently. The method presented in this invention provides means to obtain the necessary performance when dealing with a large number of time series.

Online Use for Optimization

Complex prediction models 260 can also be created and updated in real time in order to optimize the operation of a plant. The ability to quickly create and update these complex models 260 can be provided by the disclosed methods.

Conclusion

Among other benefits, aspects of the present invention generate multivariate statistical models from time series. Such multivariate statistical models can be employed for example, in a number of fields, such as finance, economics, security, energy, marketing, and the social sciences. With the growth of available sensor data in home and industry (also referred to as the Internet of things), the size of input data and the number of time series to be considered might hinder the task of finding the most representative models for explaining or predicting a target time series. In one or more embodiments, linear models are generated with a predefined number of variables by selecting such variables and corresponding time lags among, for example, many thousands of time series and lags. One or more embodiments of the invention employ a massively parallel strategy to cope with this challenge at scale.

It should therefore be understood that in other embodiments different arrangements of additional or alternative elements may be used. At least a subset of these elements may be collectively implemented on a common processing platform or each such element may be implemented on a separate processing platform.

Also, numerous other arrangements of computers, servers, storage devices or other components are possible in the exemplary distributed computing environment 400. Such components can communicate with other elements of the exemplary metadata storage environment 100 over any type of network or other communication media.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein. An article of manufacture, a computer program product or a computer readable storage medium, as used herein, is not to be construed as being transitory signals, such as electromagnetic waves.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 5:
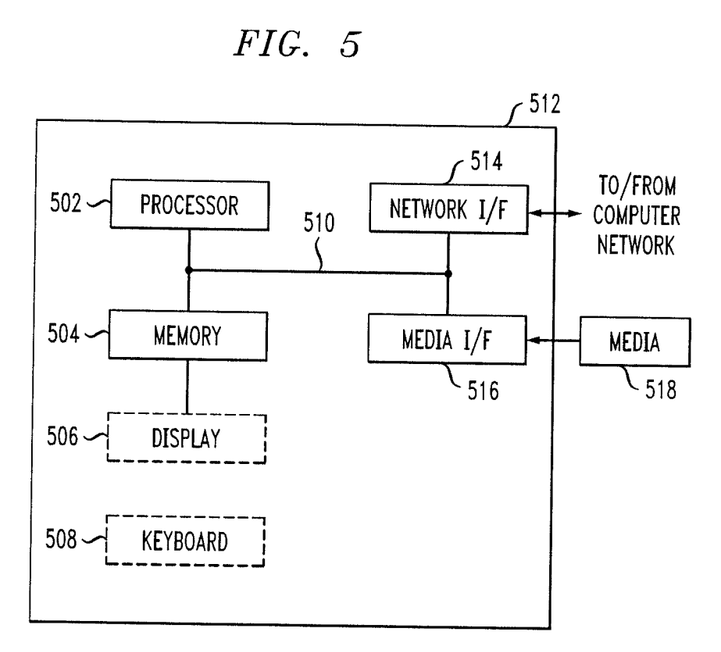
FIG. 5 is a system diagram of an exemplary computer system on which at least one embodiment of the invention can be implemented.

By way of example, an aspect of the present invention can make use of software running on a general purpose computer. FIG. 5 is a system diagram of an exemplary computer system on which at least one embodiment of the invention can be implemented. As depicted in FIG. 5, an example implementation employs, for example, a processor, 502, a memory 504, and an input/output interface formed, for example, by a display 506 and a keyboard 508. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 502, memory 504, and input/output interface such as display 506 and keyboard 508 can be interconnected, for example, via bus 510 as part of a data processing unit 512. Suitable interconnections via bus 510, can also be provided to a network interface 514 (such as a network card), which can be provided to interface with a computer network, and to a media interface 516 (such as a diskette or compact disc read-only memory (CD-ROM) drive), which can be provided to interface with media 518.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 508, displays 506, and pointing devices, can be coupled to the system either directly (such as via bus 510) or through intervening I/O controllers.

Network adapters such as network interface 514 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 512 as depicted in FIG. 5) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electromagnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems, storage systems and processing devices that can benefit from the disclosed techniques for large-scale combination of time series data. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method for generating one or more multivariate statistical models from time series data for a given target time series, comprising the steps of:

obtaining a given group of time series data on a given working compute node of a plurality of said working compute nodes, wherein said given group comprises one of a plurality of groups of time series data selected from a larger set of time series data;

generating a measurement matrix, using at least one processing device of said given working compute node, for said given group of time series data based on a plurality of time series selected for said given group and a plurality of time lags of said selected time series;

processing, using the at least one processing device of said given working compute node, said measurement matrix for said given group to generate a first linear model for the given target time series for said given group using an Orthogonal Matching Pursuit algorithm with a predefined number of first independent selected variables, wherein the predefined number of first independent selected variables is less than a total number of the plurality of time series selected for said given group and the plurality of time lags of said selected time series, and wherein each first independent selected variable corresponds to a specific time series or a particular time lag of one of the plurality of time series selected for said given group;

assigning a score, using the at least one processing device of said given working compute node, to each of said first independent selected variables based on an order of an absolute value of a coefficient of said first independent selected variable within said first linear model of said plurality of time series selected for said given group and said corresponding plurality of time lags; and providing said first independent selected variables and said corresponding assigned scores to a master compute node, wherein at least one processing device of said master compute node obtains first independent selected variables and corresponding assigned scores for each of said plurality of groups from the plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model for the given target time series using said Orthogonal Matching Pursuit algorithm.

2. The method of claim 1, wherein the plurality of groups of time series data selected from the larger set of time series data are selected using a function F.

3. The method of claim 2, wherein said function F creates each of said plurality of groups based on one or more of random and deterministic choices.

4. The method of claim 2, wherein said function F assigns at least a portion of said plurality of time series to a plurality of said groups.

5. The method of claim 2, wherein said function F assigns said plurality of time series to a balanced number of said groups.

6. The method of claim 1, wherein the final linear model characterizes a target time series represented as a linear combination of a plurality of other time series and time lags.

7. The method of claim 1, wherein a plurality of said working compute nodes process, in parallel, said plurality of groups in a distributed computing environment and each of said working compute nodes performs said steps of obtaining said given group of time series data, generating said measurement matrix, processing said measurement matrix, assigning said score to each of said first independent selected variables and providing said first independent selected variables and said corresponding assigned scores to said master compute node.

8. The method of claim 1, wherein there is a plurality of hierarchical learning levels to generate the final linear model and wherein in each intermediate level of the hierarchy, intermediate compute nodes execute the roles of said master compute node for compute nodes of the lower hierarchical level and working compute nodes for the compute nodes of the upper hierarchical level, receive said first independent selected variables and corresponding assigned scores from lower-level compute nodes, rank said first independent selected variables, select a predefined number of said first independent selected variables based on said corresponding assigned scores to be considered as input for the generation of an intermediate linear model using said Orthogonal Matching Pursuit algorithm, assign a score to each first independent selected variable of the intermediate model and provide said first independent selected variables and said corresponding assigned scores to an upper level in the hierarchy.

9. A computer program product for generating one or more multivariate statistical models from time series data for a given target time series, comprising a non-transitory machine-readable storage medium having encoded therein executable code of one or more software programs, wherein the one or more software programs when executed perform the following steps:

obtaining a given group of time series data on a given working compute node of a plurality of said working compute nodes, wherein said given group comprises one of a plurality of groups of time series data selected from a larger set of time series data;

generating a measurement matrix, using at least one processing device of said given working compute node, for said given group of time series data based on a plurality of time series selected for said given group and a plurality of time lags of said selected time series;

processing, using the at least one processing device of said given working compute node, said measurement matrix for said given group to generate a first linear model for the given target time series for said given group using an Orthogonal Matching Pursuit algorithm with a predefined number of first independent selected variables, wherein the predefined number of first independent selected variables is less than a total number of the plurality of time series selected for said given group and the plurality of time lags of said selected time series, and wherein each first independent selected variable corresponds to a specific time series or a particular time lag of one of the plurality of time series selected for said given group;

assigning a score, using the at least one processing device of said given working compute node, to each of said first independent selected variables based on an order of an absolute value of a coefficient of said first independent selected variable within said first linear model of said plurality of time series selected for said given group and said corresponding plurality of time lags; and providing said first independent selected variables and said corresponding assigned scores to a master compute node, wherein at least one processing device of said master compute node obtains first independent selected variables and corresponding assigned scores for each of said plurality of groups from the plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model for the given target time series using said Orthogonal Matching Pursuit algorithm.

10. The computer program product of claim 9, wherein the plurality of groups of time series data selected from the larger set of time series data are selected using a function F.

11. The computer program product of claim 10, wherein said function F one or more of creates each of said plurality of groups based on one or more of random and deterministic choices; assigns at least a portion of said plurality of time series to a plurality of said groups; assigns said plurality of time series to a balanced number of said groups.

12. The computer program product of claim 9, wherein the final linear model characterizes a target time series represented as a linear combination of a plurality of other time series and time lags.

13. The computer program product of claim 9, wherein a plurality of said working compute nodes process, in parallel, said plurality of groups in a distributed computing environment and each of said working compute nodes performs said steps of obtaining said given group of time series data, generating said measurement matrix, processing said measurement matrix, assigning said score to each of said first independent selected variables and providing said first independent selected variables and said corresponding assigned scores to said master compute node.

14. The computer program product of claim 9, wherein there is a plurality of hierarchical learning levels to generate the final linear model and wherein in each intermediate level of the hierarchy, intermediate compute nodes execute the roles of said master compute node for compute nodes of the lower hierarchical level and working compute nodes for the compute nodes of the upper hierarchical level, receive said first independent selected variables and corresponding assigned scores from lower-level compute nodes, rank said first independent selected variables, select a predefined number of said first independent selected variables based on said corresponding assigned scores to be considered as input for the generation of an intermediate linear model using said Orthogonal Matching Pursuit algorithm, assign a score to each first independent selected variable of the intermediate model and provide said first independent selected variables and said corresponding assigned scores to an upper level in the hierarchy.

15. A system for generating one or more multivariate statistical models from time series data for a given target time series, comprising:
a memory; and
at least one hardware device, coupled to the memory, operative to implement the following steps:
obtaining a given group of time series data on a given working compute node of a plurality of said working compute nodes, wherein said given group comprises one of a plurality of groups of time series data selected from a larger set of time series data;
generating a measurement matrix, using at least one processing device of said given working compute node, for said given group of time series data based on a plurality of time series selected for said given group and a plurality of time lags of said selected time series;
processing, using the at least one processing device of said given working compute node, said measurement matrix for said given group to generate a first linear model for the given target time series for said given group using an Orthogonal Matching Pursuit algorithm with a predefined number of first independent selected variables, wherein the predefined number of first independent selected variables is less than a total number of the plurality of time series selected for said given group and the plurality of time lags of said selected time series, and wherein each first independent selected variable corresponds to a specific time series and or a particular time lag of one of the plurality of time series selected for said given group;
assigning a score, using the at least one processing device of said given working compute node, to each of said first independent selected variables based on an order of an absolute value of a coefficient of said first independent selected variable within said first linear model of said plurality of time series selected for said given group and said corresponding plurality of time lags; and
providing said first independent selected variables and said corresponding assigned scores to a master compute node, wherein at least one processing device of said master compute node obtains first independent selected variables and corresponding assigned scores for each of said plurality of groups from the plurality of said working compute nodes; ranks the said first independent selected variables according to said corresponding assigned scores for all of said plurality of groups; selects a predefined number of second independent selected variables based on a final rank to create a final group of time series; and processes said final group of time series to generate a final linear model for the given target time series using said Orthogonal Matching Pursuit algorithm.

16. The system of claim 15, wherein the plurality of groups of time series data selected from the larger set of time series data are selected using a function F.

17. The system of claim 16, wherein said function F one or more of creates each of said plurality of groups based on one or more of random and deterministic choices; assigns at least a portion of said plurality of time series to a plurality of said groups and assigns said plurality of time series to a balanced number of said groups.

18. The system of claim 15, wherein the final linear model characterizes a target time series represented as a linear combination of a plurality of other time series and time lags.

19. The system of claim 15, wherein a plurality of said working compute nodes process, in parallel, said plurality of groups in a distributed computing environment and each of said working compute nodes perfoins said steps of obtaining said given group of time series data, generating said measurement matrix, processing said measurement matrix, assigning said score to each of said first independent selected variables and providing said first independent selected variables and said corresponding assigned scores to said master compute node.

20. The system of claim 15, wherein there is a plurality of hierarchical learning levels to generate the final linear model and wherein in each intermediate level of the hierarchy, intermediate compute nodes execute the roles of said master compute node for compute nodes of the lower hierarchical level and working compute nodes for the compute nodes of the upper hierarchical level, receive said first independent selected variables and corresponding assigned scores from lower-level compute nodes, rank said first independent selected variables, select a predefined number of said first independent selected variables based on said corresponding assigned scores to be considered as input for the generation of an intermediate linear model using said Orthogonal Matching Pursuit algorithm, assign a score to each first independent selected variable of the intermediate model and provide said first independent selected variables and said corresponding assigned scores to an upper level in the hierarchy.

* * * * *

UNITED STATES PATENT AND TRADEMARK OFFICE
CERTIFICATE OF CORRECTION

PATENT NO. : 10,339,235 B1
APPLICATION NO. : 15/078224
DATED : July 2, 2019
INVENTOR(S) : Angelo E. M. Ciarlini et al.

Page 1 of 1

It is certified that error appears in the above-identified patent and that said Letters Patent is hereby corrected as shown below:

In the Claims

Column 16, Line 53, Claim 19, replace "perfoinis" with --performs--.

Signed and Sealed this
Thirteenth Day of August, 2019

Andrei Iancu
*Director of the United States Patent and Trademark Office*